(No Model.)
E. THOMSON.
COUPLING COMPOUND DYNAMO ELECTRIC MACHINES.
No. 367,471. Patented Aug. 2, 1887.
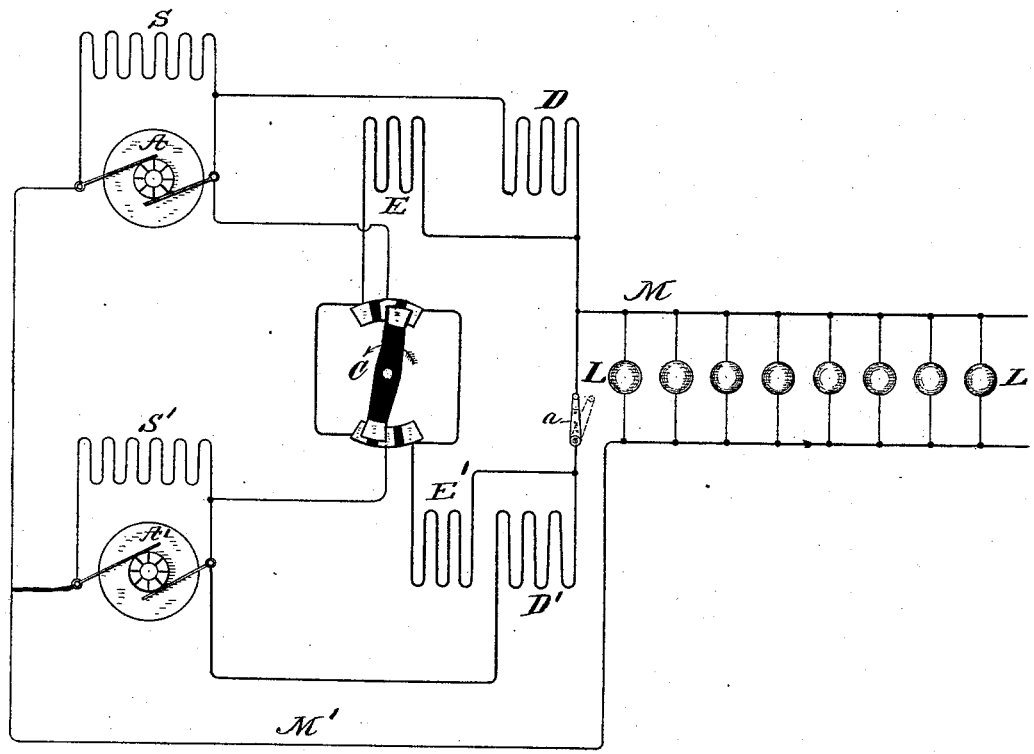
WITNESSES:
INVENTOR
Elihu Thomson.
BY
ATTORNEY

United States Patent Office.

ELIHU THOMSON, OF LYNN, MASSACHUSETTS.

COUPLING COMPOUND DYNAMO-ELECTRIC MACHINES.

SPECIFICATION forming part of Letters Patent No. 367,471, dated August 2, 1887.

Application filed June 4, 1886. Serial No. 204,130. (No model.)

*To all whom it may concern:*

Be it known that I, ELIHU THOMSON, a citizen of the United States, and a resident of Lynn, in the county of Essex and State of Massachusetts, have invented certain new and useful Coupling Compound Wound Dynamos, of which the following is a specification.

My invention consists in the combination, with two or more dynamo-machines working in parallel and coupled, as will be hereinafter described, to prevent one machine working through the other, of a switch in the connections between the two machines adapted to change the circuits, so as to permit each machine to be used independently of the other in the manner to be hereinafter set forth.

The drawing illustrates diagrammatically the invention.

A A' are the armatures, respectively, of two machines.

S S' indicate the ordinary shunt or derived circuit field-coils, respectively, for said machines, and M M' the positive and negative mains, respectively. L L indicate lights or other working-resistances operated therefrom in parallel. The main or series field-coil of each machine I divide into two portions, D E, on one machine, and D' E' on the other machine, one portion of each machine—as, for instance, D, of machine A—being connected into circuit in the ordinary way, while the other portion, as E, is in a branch leading from the commutator of another machine. In the same manner the coil D' of machine A' is connected into circuit in the ordinary way, while the portion E' of the same machine is in a branch from the brush of machine A, which supplies current to the coil D. By this arrangement each machine is connected to the general circuit through two branches, one containing a coil on the machine itself and the other a coil on the other machine. This crossed connection is made by a switch or commutator—such as is indicated at C—consisting of a pivoted insulating-piece, carrying metal pieces on each end which bear on metal blocks connected as shown, the middle block, upper and lower, respectively, to A A', or the brushes on the commutator thereof, while the two opposite blocks on one side are connected to E, and two others to E'. The currents in D and E and in D' and E' add their effects on the fields, and to these again are added the fields produced by S S'. It will be seen that D is fed by A, E by A', D' by A', and E' by A, so that each machine depends on the armature of the other for a large part of its field. This is the condition of stability in such machines. Notwithstanding this fact, the arrangement is very different from the case of feeding the series field of each machine by the armature of the other alone, as in that case the rupture of the circuit of one machine puts the other out of action by taking away its series field, while in the present case the machine would retain that portion of its series field fed by its own armature. It will be seen, moreover, that in my arrangement the rupture of the circuit of one coil—as, for instance, coil D—on one machine will still leave both coils of the other machine in action.

The switch C may be thrown over so as to disconnect from the middle blocks the blocks which are shown connected and connect the others, in which case the armature of each machine feeds only its own field-coils, as D and E, in multiple arc, and one machine may be thrown out of action by opening a switch at *a* when it is desired to keep the other alone in action. It is best to make D and E and D' and E' of equal resistance where the machines coupled are of equal capacity.

What I claim as my invention is—

The combination, with dynamo-machines connected in multiple arc and each maintained in part by a branch from the field-coil circuit of the other, of an intermediate switch, C, having connections, as described, to the coils, whereby each machine may be made to feed its own field-coils only in multiple arc.

Signed at Lynn, in the county of Essex and State of Massachusetts, this 28th day of May, A. D. 1886.

ELIHU THOMSON.

Witnesses:
M. L. THOMSON,
N. M. HAWKES.